J. W. HILL.
FLOATING TOOL OR TOOL HOLDER.
APPLICATION FILED MAR. 26, 1909.
1,041,792.
Patented Oct. 22, 1912.
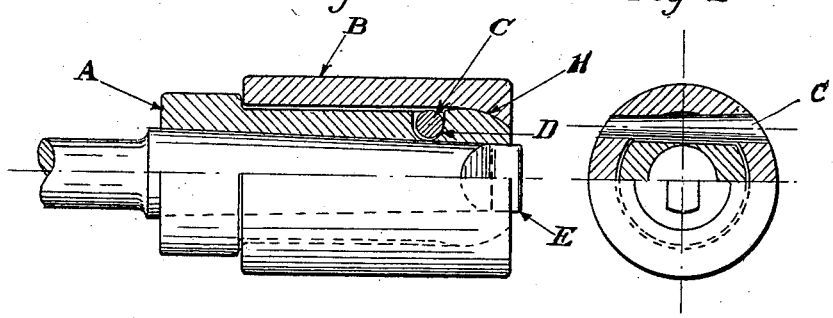
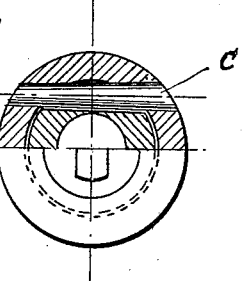
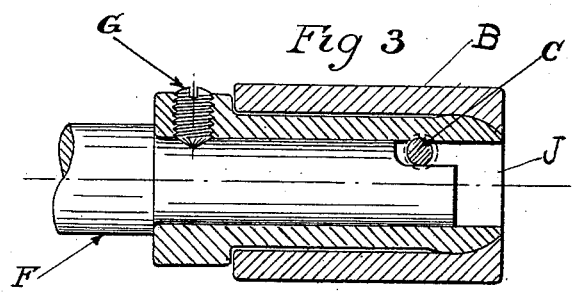
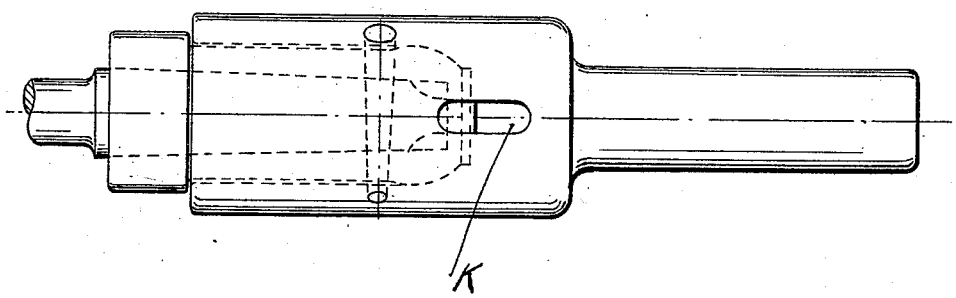
WITNESSES:
INVENTOR.

UNITED STATES PATENT OFFICE.

JOHN WILLIAM HILL, OF PROVIDENCE, RHODE ISLAND.

FLOATING TOOL OR TOOL-HOLDER.

1,041,792.  Specification of Letters Patent.  Patented Oct. 22, 1912.

Application filed March 26, 1909.  Serial No. 485,968.

*To all whom it may concern:*

Be it known that I, JOHN W. HILL, a citizen of the United States, residing at Providence, in county of Providence and State of Rhode Island, have invented certain new and useful Improvements in Floating Tools or Tool-Holders; and I do declare that the following is a full, clear, and exact description of the invention, which will enable others skilled in the art to which it appertains to make and use the same.

My invention relates to floating tools, or tool holders for use in screw machines, drill presses, boring machines and other machine tools.

My invention will hold reamers, drills, taps, counter bores and other tools.

The holes in turret of screw machines for holding tools, in many cases, are not in true alinement with the spindle and frequently the means by which tools are fastened (by screw or key) tend to put said tools out of alinement.

My improvements which hold reamers, drills, taps, counter bores and other tools, is therefore, designed to overcome and remedy this defect and is accomplished by having a tool or tool holder within an outer shell or socket, free to aline itself automatically with the spindle or work, by oscillating in its seat and prevent it from rotating by means furnished.

My improved tool-holder proper is so devised that when mounted and in normal use the combined rotative effect and pressure of the work upon the relatively stationary tool, as in boring a hole, is utilized to maintain the tool firmly in the holder's socket, thereby preventing the tool from "chattering" and at the same time insuring the cutting of a perfectly true and straight hole. The tool-holder is adapted to receive straight-shank or standard taper-shank tools having a flattened portion or "tang" at its small or free end fitting into and passing through a correspondingly shaped slot in the base of the holder, thereby adapting it to be employed as a driver; the end of the tang projecting through the holder also serves as a means for ejecting the tool therefrom. The same means are utilized with a straight-shank tool to serve as a driver as are used to prevent the tool-holder from rotating, all as more fully hereinafter set forth and claimed.

In the accompanying sheet of drawings, Figure 1 represents, in combined longitudinal central section and side elevation, my improved tool-holder having a taper-shank tool mounted therein; Fig. 2 is a combined transverse section and end elevation of the same; Fig. 3 is a central longitudinal sectional view of a modified form of the device, complete; and Fig. 4 represents a side elevation of another modification provided with a taper-shank tool, the holder proper being removably mounted in a socketed taper-shank outer shell having a transverse drift-slot extending through it.

My invention relates to a floating tool-holder and comprises the tool-holder A, which is cylindrical in form and which has one end slightly enlarged and formed into a spherical bearing portion. The holder A is provided with a bore of suitable shape to receive the shank of any desired form of cutting-tool, which shank may be either tapered or straight. The first arrangement is clearly shown in Fig. 1, while the second is shown in Fig. 3. When the holder A is made to receive a taper-shank tool, it is provided with a slot to receive the usual tang shown at E and which extends slightly beyond the holder and its socket B in order that the tool may be readily removed when the holder is used with the special form of socket illustrated in Fig. 4, which will be described later.

The holder A is arranged to be held in a socket B having a bore somewhat greater in diameter than the cylindrical portion of the holder A. This bore is slightly reduced at one end and formed into a spherical bearing portion H arranged to receive that on the holder A. These spherical bearing portions, in conjunction with the difference in diameter of the holder and bore of the socket, permit the holder to oscillate slightly and thus to automatically adjust itself in case the spindle and turret holes are not in exact alinement. It will be obvious that the amount of such adjustment can be controlled by varying the diameters of the holder and its socket. The outer surface of the socket may be of any suitable form to be securely held in the turret of the ordinary screw machine, or other machine. It will be noted that with the arrangement shown the end thrust due to the cut is taken by the spherical bearing portions, with the result that the tool-holder is held firmly in its seat and automatically adjusts itself for any wear that may take place.

To hold the holder from turning relatively to its socket, I provide them with a transverse tapered orifice to receive a taper pin C which locks the parts together; the connection being, however, sufficiently loose to permit the holder A to oscillate in its socket. It is to be noted that in the modification shown in Fig. 3 the pin passes through the holder A and engages a flattened portion provided on the straight shank of the tool F. In this instance the tool is held to the holder by means of the screw G.

In Fig. 4 I have shown a special form of socket B, which is intended to be used with the form of tool-holder shown in Fig. 1. In this case the socket is elongated and provided with a reduced extension to form the shank, which may be either straight or tapered, as desired. This arrangement permits of the tool being held in a smaller opening than that required by the socket shown in Fig. 1. The socket is provided with a transverse slot K so that the tool can be forced from the holder by the usual form of drift.

It is to be observed that the holder has a central longitudinal bore or hole extending throughout its length adapted to receive the shank of the cutting-tool; the opening in the bottom end wall conforming to the tang portion of the shank. The tang part may have a rectangular shape cross-sectionally, so that when the tool is properly inserted in the holder member (the latter in turn being inserted in and secured to the driven outer or socket member) the cutting-tool is adapted to be positively actuated.

I claim as my invention and desire to secure by United States Letters Patent:—

1. As an improved article of manufacture a floating tool-holder device, comprising an annular one-piece socket member or casing adapted to be removably mounted in a revoluble chuck or driver, said member being bored throughout its length and having its lower end terminating in an inwardly facing socket-shaped seat, a centrally bored holder element proper movably mounted in said socket member and having its lower portion conforming to and being in normally continuous engagement with said seat, the other portion of the holder element being at the same time capable of independent limited lateral movement in the socket member, and means provided for detachably securing a cutting tool in the device, whereby when in use all the parts of the device are adapted to rotate in unison.

2. In a floating tool-holder device, the combination of a centrally bored and socketed outer member having a stem or extension at its rear end, a tool-holder member proper mounted to vibrate slightly in the outer member, having its inner end fitted to and being in continuous engagement with the adjacent surface of the socket, means for connecting the two members together against endwise separation, and having said outer member provided with a transversely disposed drift-slot communicating with the socket whereby a tool mounted in the device may be detached therefrom.

JOHN WILLIAM HILL.

Witnesses:
GEORGE WILLIS SWIFT,
ROBERT MAWSON.

Copies of this patent may be obtained for five cents each, by addressing the "Commissioner of Patents, Washington, D. C."